(12) United States Patent
Pistacchio (10) Patent No.: US 11,865,881 B2
(45) Date of Patent: Jan. 9, 2024

(54) REMOVABLE GOOSENECK TRAILER SYSTEM WITH SUPPORT STRUCTURES

(71) Applicant: Cozad Trailer Sales, LLC, Stockton, CA (US)

(72) Inventor: Tom G. Pistacchio, Stockton, CA (US)

(73) Assignee: COZAD TRAILER SALES, LLC, Stockton, CA (US)

( * ) Notice: Subject to any disclaimer, the term of this patent is extended or adjusted under 35 U.S.C. 154(b) by 422 days.

(21) Appl. No.: 16/186,427

(22) Filed: Nov. 9, 2018

(65) Prior Publication Data

US 2019/0135061 A1 May 9, 2019

Related U.S. Application Data

(60) Provisional application No. 62/584,054, filed on Nov. 9, 2017.

(51) Int. Cl.
*B60D 1/52* (2006.01)
*B62D 53/08* (2006.01)
*B62D 53/06* (2006.01)

(52) U.S. Cl.
CPC ............ *B60D 1/52* (2013.01); *B62D 53/065* (2013.01); *B62D 53/0828* (2013.01); *B60Y 2200/148* (2013.01)

(58) Field of Classification Search
CPC .......... B60D 1/52; B60D 1/015; B60D 1/143; B60Y 2200/148; B62D 53/065; B62D 53/0828
USPC ....................................................... 280/495
See application file for complete search history.

(56) References Cited

U.S. PATENT DOCUMENTS

| | | | | |
|---|---|---|---|---|
| 2,364,365 A | * | 12/1944 | Hultquist | B62D 53/065 414/476 |
| 2,555,336 A | * | 6/1951 | Hagely | B60S 9/06 254/424 |
| 2,607,937 A | * | 8/1952 | Stone | B65G 69/30 14/69.5 |
| 2,836,432 A | * | 5/1958 | Delp | B60S 9/06 280/475 |
| 3,181,891 A | * | 5/1965 | Moats | B60S 9/04 280/475 |
| 3,183,854 A | * | 5/1965 | Candlin, Jr. | B61D 45/005 403/85 |
| 3,261,488 A | * | 7/1966 | Van Raden | B60P 3/41 414/498 |
| 4,065,825 A | * | 1/1978 | Cohen | B60P 3/07 14/72.5 |

(Continued)

*Primary Examiner* — Anne M Boehler
*Assistant Examiner* — Felicia L. Brittman
(74) *Attorney, Agent, or Firm* — Ferguson Case Orr Paterson (57) ABSTRACT

A gooseneck trailer system with support structures. The trailer system can comprise a gooseneck removably connected to a trailer and a support structure connected to the gooseneck. The support structure can be configured to support the gooseneck when the gooseneck is disconnected from the trailer. In some embodiments, the support structure can comprise at least one support arm connected to a frame of the gooseneck which can be pivoted between a retracted position and at least one deployed position. The present disclosure can also include methods of using the gooseneck trailer system with a tractor such that the support structure abuts against the tractor, safely securing the gooseneck to the tractor.

3 Claims, 7 Drawing Sheets

(56) References Cited

U.S. PATENT DOCUMENTS

2006/0081755 A1* 4/2006 Thorpe .................... B60S 9/06
248/354.1

* cited by examiner

REMOVABLE GOOSENECK TRAILER SYSTEM WITH SUPPORT STRUCTURES

RELATED APPLICATION

This application claims priority to U.S. Prov. Pat. App. Ser. No. 62/584,054, which was filed on Nov. 9, 2017. The application cited in this paragraph is incorporated by reference as if set forth fully herein.

BACKGROUND

Field

The present disclosure relates generally to gooseneck trailer systems, and more particularly, to removable gooseneck trailer systems with support structures.

Description of the Related Art

Heavy equipment hauling can be difficult and time consuming. While several different types of trailers can be used to haul heavy equipment, removable gooseneck trailers provide many advantages. For example, these trailers drop near the ground in the middle of the trailer, allowing heavy equipment to be held lower to the ground. This gives users more height to work with, helping to avoid issues with height permits and constraints.

Removable gooseneck trailers allow for a raised portion (or gooseneck) attached at one end of the trailer to detach from the trailer. After the gooseneck is detached, large pieces of equipment can be more easily moved onto the trailer as the middle of the trailer sits near the ground. After the equipment is loaded, the gooseneck can be reattached and the equipment secured in place. This simplifies the process of loading and unloading.

The gooseneck design does present some challenges. The process of detaching the gooseneck from the trailer can be cumbersome and dangerous. For example, when a tractor engages with the gooseneck trailer when it is detached from the trailer, the shape of the gooseneck can create a large gap between the tractor and the gooseneck near the back of the tractor. Without additional support, gravity forces the gooseneck to either fall off the tractor or severely bounce up and down, causing damage to the gooseneck. To compensate for this gap, objects such as a block of wood have been placed between the tractor and the gooseneck. However, this does not provide a secure support. Often, the gooseneck will still shift and bounce, especially when the tractor turns or changes speed. In some cases, the gooseneck will even fall off the tractor. Additionally, placing objects between the gooseneck and tractor requires a user to crawl underneath them, creating a dangerous situation and forcing the user into uncomfortable positions.

SUMMARY OF THE DISCLOSURE

The present disclosure relates to novel and improved removable gooseneck trailers with support structures. Embodiments described in the present disclosure can provide a gooseneck trailer system with a gooseneck, a trailer, and a support structure. The support structure can be connected to the frame of the gooseneck. The gooseneck can be removably connected to the trailer, and the support structure can be configured to abut against a tractor such that it supports the gooseneck when it is disconnected from the trailer. The tractor can then drive away safely, pulling only the gooseneck, with the support structure securely supporting it and preventing it from falling off the tractor and/or bouncing and sliding. This configuration also allows large equipment to more easily be moved onto the trailer, which sits on or near the ground when it is disengaged from the rest of the system.

One embodiment described in the present disclosure comprises a trailer support structure comprising at least one support arm configured to be pivotably connected to a frame and a crossbar horizontally connected to the at least one support arm. The at least one support arm can be configured to pivot between a retracted position and at least one deployed position.

Another embodiment described in the present disclosure comprises a gooseneck trailer system comprising a gooseneck which itself comprises a frame, a support structure connected to the frame, and an adjuster for moving the support structure between a retracted position and at least one deployed position.

One embodiment of a method for using a trailer system described in the present disclosure comprises positioning a tractor such that the tractor engages with a gooseneck and adjusting an adjuster to move a support structure to a deployed position and, if necessary, moving the tractor such that the support structure abuts against a ramp portion of the tractor, wherein the support structure is connected to a frame of the gooseneck and the adjuster is located on the frame.

These and other further features and advantages provided in this disclosure would be apparent to those skilled in the art from the following detailed description, taken together with the accompanying drawings.

DETAILED DESCRIPTION OF THE DISCLOSURE

The present disclosure relates to novel and improved removable gooseneck trailers with support structures that can provide support to the gooseneck in any application. Embodiments described in the present disclosure can comprise a gooseneck with a frame. In some embodiments, the gooseneck can first be disconnected from a trailer. Second, a user can drive a tractor in reverse such that it engages with the gooseneck, allowing the tractor to drive forward pulling only the gooseneck with it, leaving the trailer behind. This provides the advantage of making it easier to place heavy equipment on the trailer.

While the tractor is pulling the gooseneck, the shape of the gooseneck can create a large gap between the tractor and the gooseneck near the back of the tractor. To account for this gap, a support structure can be configured to securely support the gooseneck while the tractor drives. The support structure can comprise at least one support arm and a crossbar. The at least one support arm can be pivotably connected to a gooseneck frame and can be configured to pivot between a retracted position and a deployed position. In some embodiments, the gooseneck can comprise an adjuster for moving the support structure between the retracted position and the deployed position. The adjuster can be located on an outside portion on the frame, providing the advantage of allowing a user to easily and safely adjust the support structure between the retracted and deployed positions. The crossbar can be horizontally connected to the at least one support arm and can comprise brackets at each of its ends. The brackets can abut against the tractor when the support arm is deployed, providing a secure engagement between the gooseneck and the tractor frame.

Methods for using a trailer system are also disclosed herein. In one method, a user can first use an adjuster located on the frame of the gooseneck such that the support structure is in a retracted position. Second, the user can disconnect the gooseneck from a trailer. Third, the user can drive the tractor in reverse such that the gooseneck and the tractor engage. Fourth, the user can adjust the adjuster to move the support structure from the retracted position to a deployed position such that the support structure abuts against a ramp portion of the tractor. Last, the user can drive the tractor forward, pulling the gooseneck away from the trailer. This method provides the advantages of ease of use and improved safety. For example, the user no longer has to crawl underneath the trailer to provide a support, and can instead use the adjuster located on the outside portion of the goosenecks frame. Additionally, the brackets on the ends of the crossbar allow for the support structure to abut against the tractor without sliding horizontally when the tractor turns, hits a bump, and/or changes speed.

Throughout this disclosure, the embodiments illustrated should be considered as exemplars, rather than as limitations on the present disclosure. As used herein, the term "invention," "device," "apparatus," "method," "disclosure," "present invention," "present device," "present apparatus," "present method," or "present disclosure" refers to any one of the embodiments of the disclosure described herein, and any equivalents. Furthermore, reference to various feature(s) of the "invention," "device," "apparatus," "method," "disclosure," "present invention," "present device," "present apparatus," "present method," or "present disclosure" throughout this document does not mean that all claimed embodiments or methods must include the reference feature(s).

It is also understood that when an element or feature is referred to as being "on" or "adjacent" to another element or feature, it can be directly on or adjacent the other element or feature or intervening elements or features may also be present. In contrast, when an element is referred to as being "directly on" or extending "directly onto" another element, there are no intervening elements present. Additionally, it is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Furthermore, relative terms such as "inner," "outer," "upper," "top," "above," "lower," "bottom," "beneath," "below," and similar terms, may be used herein to describe a relationship of one element to another. Terms such as "higher," "lower," "wider," "narrower," and similar terms, may be used herein to describe angular relationships. It is understood that these terms are intended to encompass different orientations of the elements or system in addition to the orientation depicted in the figures.

Although the terms first, second, third, etc., may be used herein to describe various elements, components, regions, and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present disclosure. As used herein, the term "and/or" includes any and all combinations of one or more of the associated list items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. For example, when the present specification refers to "an" assembly, it is understood that this language encompasses a single assembly or a plurality or array of assemblies. It is further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Embodiments as described in the present disclosure can be described herein with reference to view illustrations that are schematic in nature. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region and are not intended to limit the scope of the disclosure.

FIGS. 1A-1E show embodiments of a trailer system 100 that can comprise a gooseneck 102, a trailer 104, a tractor 106, a frame 108, an adjuster 110, a support structure 112, and a tractor ramp 114. A king pin component of the gooseneck 102 can connect with a fifth wheel component of the tractor 106, engaging the gooseneck 102 and the tractor 106 together. As best shown in FIG. TA, one end of the gooseneck 102 and one end of the trailer 104 can be connected together. Pins and shackles, or other means known in the art, can be used for this connection. This allows the tractor 106 to pull both the gooseneck 102 and the trailer 104 at the same time. The gooseneck 102 can be shaped such that it comprises a raised portion that engages with the tractor 106 and a lower portion that engages with the trailer 104. This provides the advantage of allowing the trailer 104 to sit lower to the ground, giving users the ability to place objects with greater heights onto the trailer 104 and/or stacking more objects onto the trailer 104.

Figure 1A:
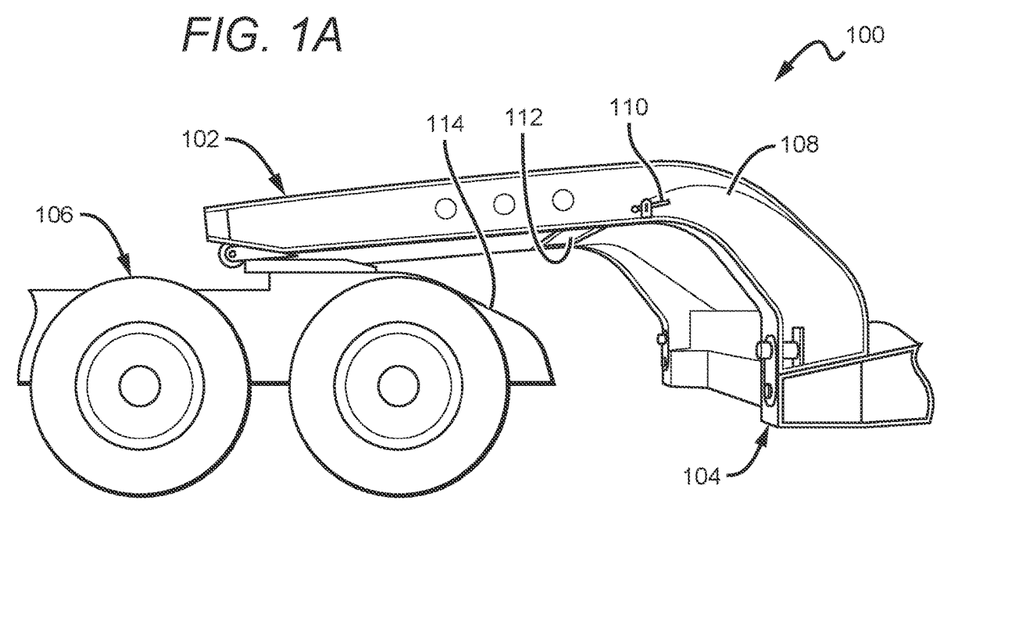
FIG. 1A is a right side perspective view of a trailer system according to the present disclosure.
Figure 1B:
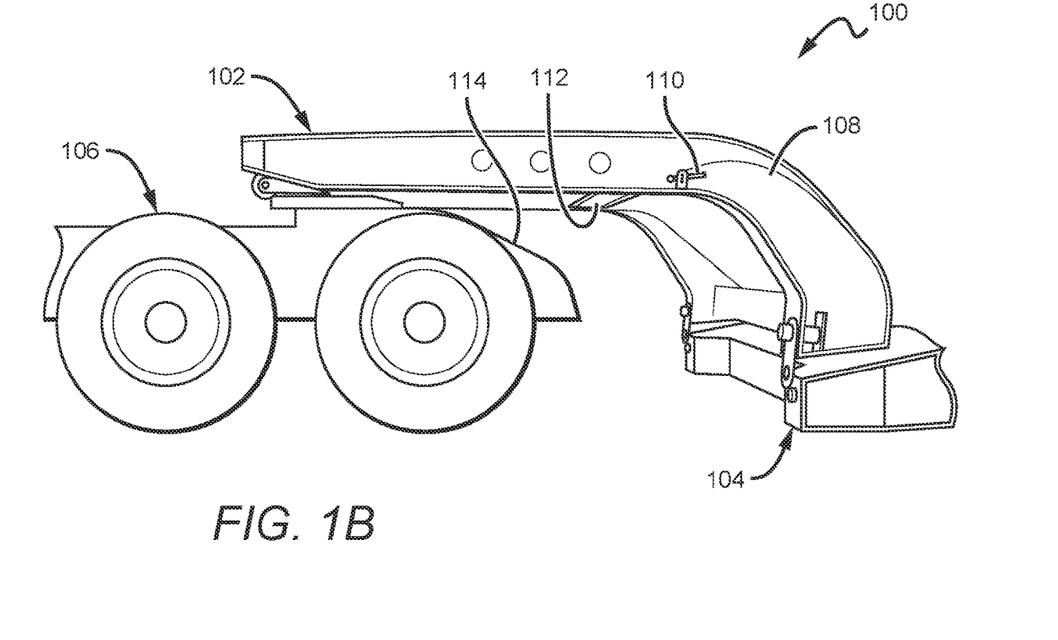
FIG. 1B is a perspective view of the trailer system in FIG. 1A.

As best shown in FIG. 1B, the gooseneck 102 and the trailer 104 can be connected and disconnected. Pins and shackles, or other means known in the art, can be used for this connection. Detaching the gooseneck 102 from the trailer 104 provides the advantage of allowing large pieces of equipment to be more easily be moved onto the trailer 104 after the tractor 106 pulls the gooseneck 102 away from the trailer 104. After the equipment is loaded, the gooseneck 102 can be reattached to the trailer 104 and the equipment secured in place, simplifying the process of loading and unloading.

Figure 1C:
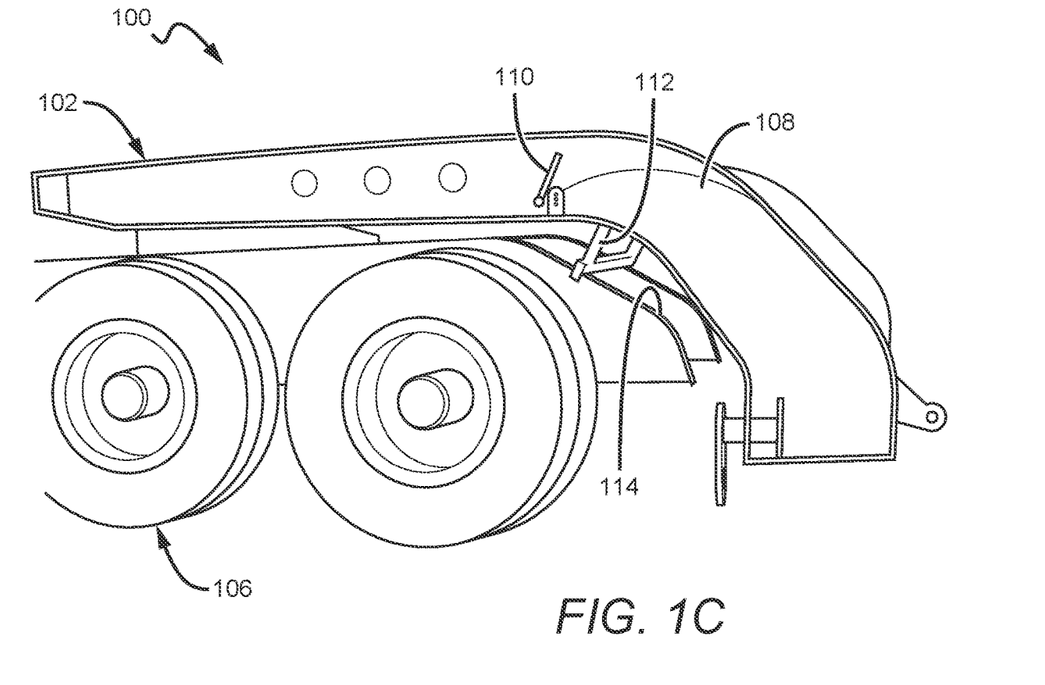
FIG. 1C is a perspective view of the trailer system in FIG. 1A.
Figure 1D:
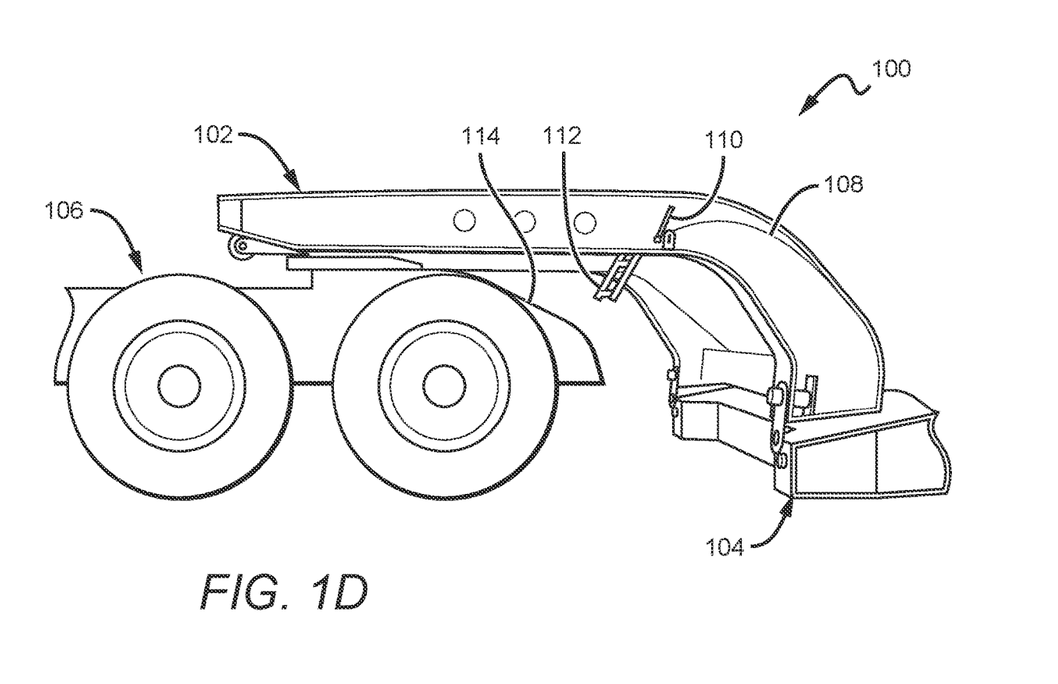
FIG. 1D is a perspective view of the trailer system in FIG. 1A.
Figure 1E:
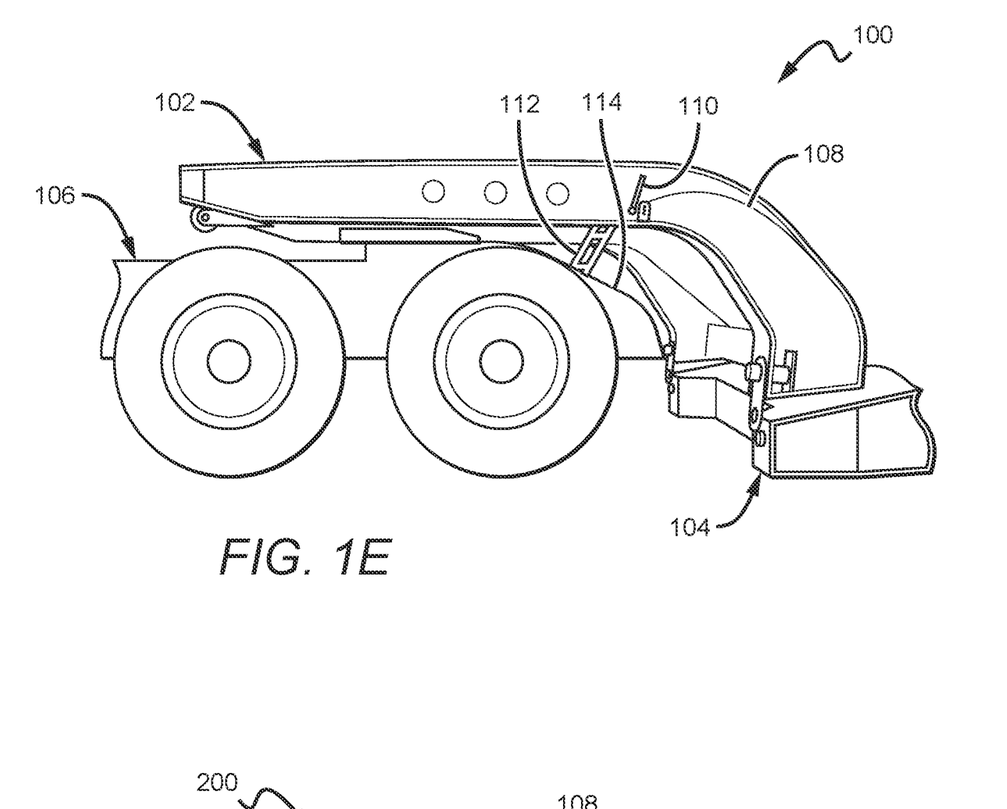
FIG. 1E is a perspective view of the trailer system in FIG. 1A.

The shape of the gooseneck 102 can create a large gap between the back of the tractor 106 and vertical portion of the gooseneck 102. To account for this gap, a support structure 112 can be configured to securely support the gooseneck 102 while the tractor 106 drives, as best shown in FIG. 1C. This provides the advantage of securely supporting the gooseneck 102 while the tractor 106 drives. The support structure 112 can be connected to the frame 108 of the gooseneck 102. In some embodiments, the support structure 112 can be pivotably connected to the frame 108 such that the support structure 112 can be in a retracted position as best shown in FIGS. 1A-1B or in a deployed position as best shown in FIGS. 1D-1E. When the support structure 112 is in the retracted position, it can be locked and stowed substantially parallel to a top portion of the frame 108. When the support structure 112 is in the deployed position, it can be angled relative to the frame 108 such that it securely abuts against the tractor ramp 114, as shown in FIG. 1E. In various embodiments, the support structure 112 may be configured to deploy over a range of angles, with one suitable angle being an angle which results in the support structure 112 abutting the tractor ramp 114 at an approximate right angle, as shown in FIG. 1C. An approximate right angle provides a sturdy abutment, although it is understood that other angles may also provide a sturdy abutment. In one embodiment, the angle of the support structure in the deployed position is adjustable to accommodate various tractor ramp configurations and dimensions. In another embodiment, the angle of deployment is fixed.

Figure 2A:
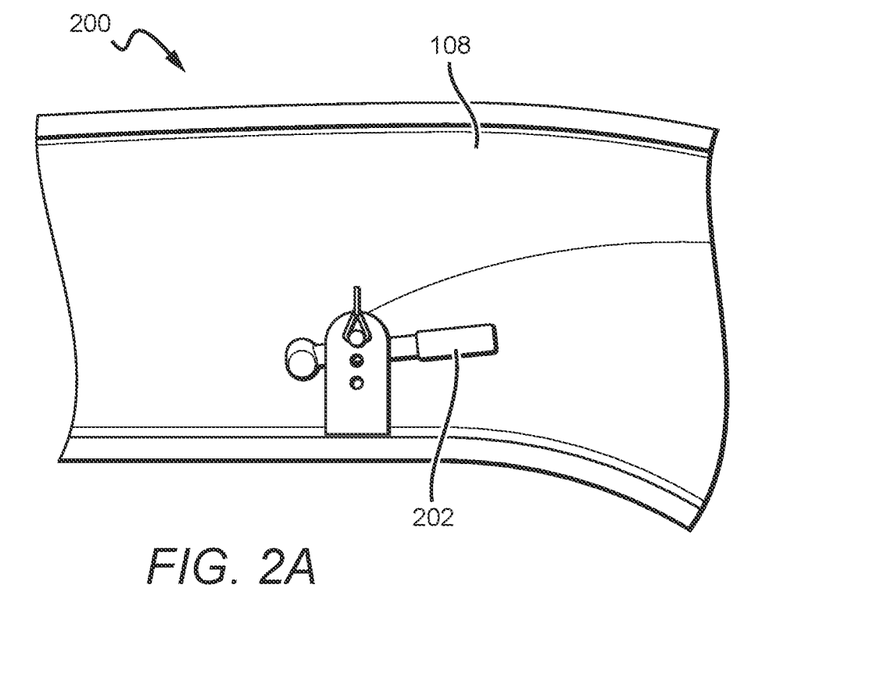
FIG. 2A is a perspective view of an embodiment of an adjuster used with the trailer system according to the present disclosure.
Figure 2B:
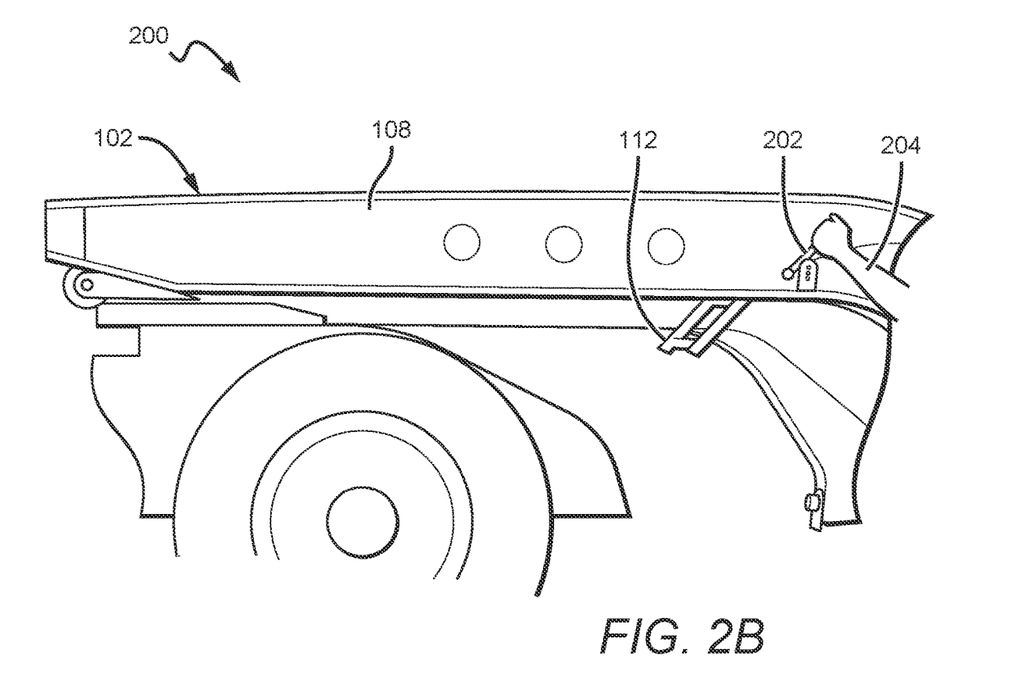
FIG. 2B is a perspective view of the adjuster in FIG. 2A.

Embodiments described herein can also include trailer systems with adjusters used to move support structures between a stowed position and various deployed positions. FIGS. 2A-2B show embodiments of a trailer system 200 comprising an adjuster 202, a frame 108, a gooseneck 102, a support structure 112, and a user 204. As best shown in FIG. 2A, the adjuster 202 can be a lever and can be located on an outside portion of the frame 108 of the gooseneck 102. This provides the advantage of ease of use and improved safety. For example, providing support to the gooseneck 102 can now be done without the need to crawl underneath the gooseneck 102, saving time and preventing potential injury. As best shown in FIG. 2B, the user 204 can exert force on the adjuster 202 to pivotally move the support structure 112 from a retracted position substantially parallel to the raised portion of the gooseneck 102 to a deployed position angled relative to the gooseneck 102 frame. Additionally, the user 204 can exert force on the adjuster 202 to pivotally move the support structure 112 from the deployed position to the retracted position and vice versa. In one embodiment, the adjuster comprises a lever which actuates the support structure by mechanical means. In another embodiment, the adjuster comprises an electro-mechanical system to actuate the support structure. For example, the lever may function to send a signal to another system which causes the support structure to deploy and retract. In another embodiment, the adjuster may comprise a button or switch which actuates the support structure. The adjuster may be conveniently located on the gooseneck 102 frame as shown in FIGS. 2A and 2B, or it may be located in another location, for example, in the cab of the tractor. Indeed, in an electro-mechanical embodiment, the adjuster may be actuated remotely using a wireless electrical signal from a cell phone sent over a network or via a Bluetooth connection, for example.

Figure 3A:
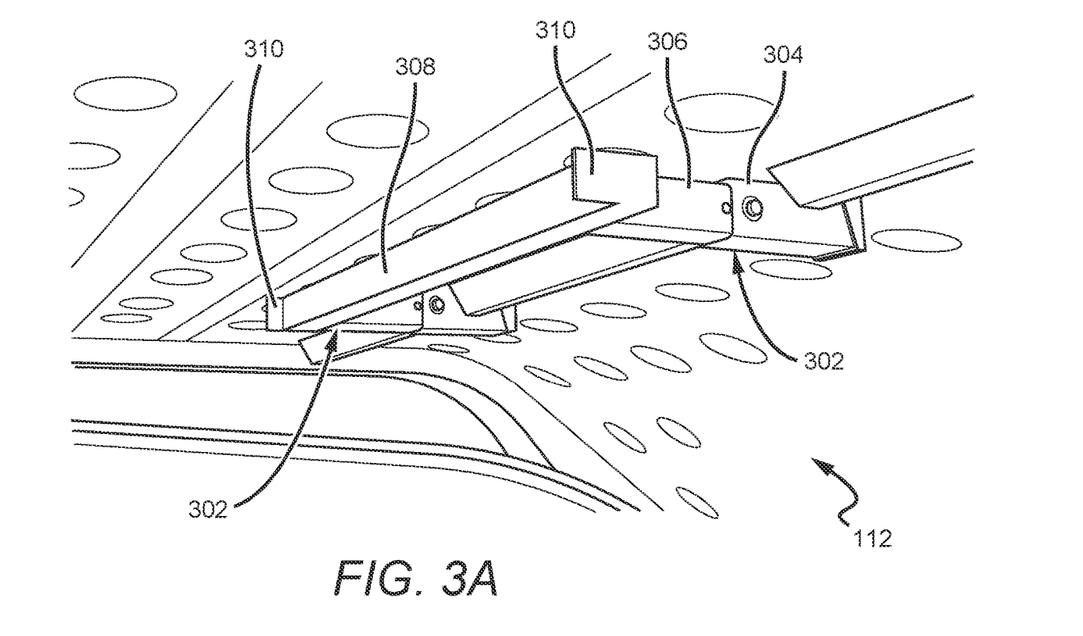
FIG. 3A is a perspective view of an embodiment of a support structure used with the trailer system according to the present disclosure.
Figure 3B:
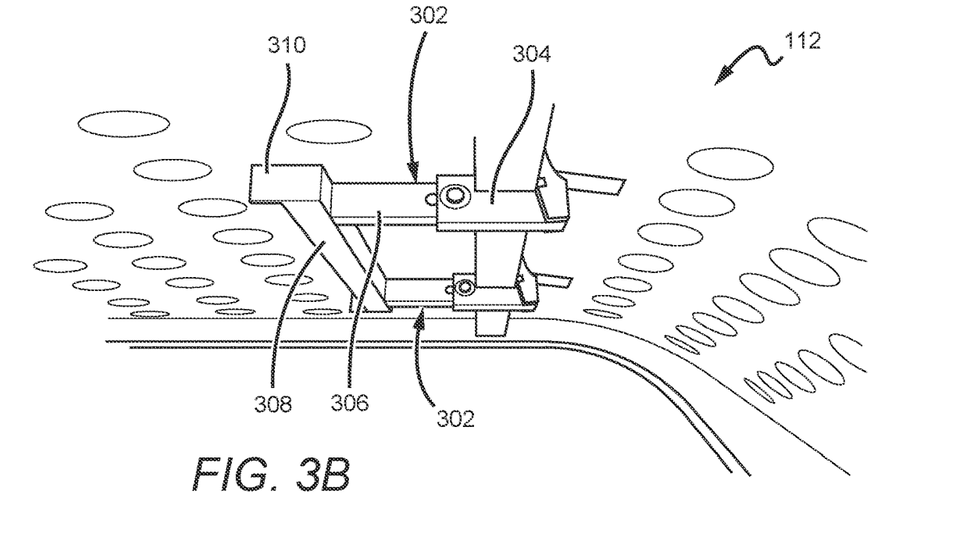
FIG. 3B is a perspective view of the support structure in FIG. 3A.

FIGS. 3A-3B show embodiments of a support structure 112 comprising at least one support arm 302, a sleeve portion 304, a telescoping portion 306, a crossbar 308, and brackets 310. The at least one support arm 302 (two shown in FIGS. 3A-3B) can be pivotably connected to a frame as described above, such that it pivots between a retracted position and at least one deployed position. However, the at least one support arm 302 can also be connected to the frame by other means known in the art. The at least one support arm 302 can comprise the sleeve portion 304 and the telescoping portion 306. The telescoping portion 306 can be configured to slide in and out of the sleeve portion 304, allowing the length of the at least one support arm 302 to be adjusted.

In some embodiments, the at least one support arm 302 comprises a discrete number of positions that the length can be adjusted to. To change positions in these embodiments, the telescoping portion 306 can comprise a number of holes, for example. The telescoping portion 306 can then slide into the sleeve portion 304. The sleeve portion 304 can comprise a screw, pin, or other known locking mechanism which can fit into one of the holes on the telescoping portion 306, locking the telescoping portion 306 and sleeve portion 304 into place at a certain length. For example, when the telescoping portion 306 slides further into the sleeve portion 304, it shortens the length of the at least one support arm 302. When the telescoping portion 306 slides a smaller distance into the sleeve portion 304, it increases the length of the at least one support arm 302, allowing it to drop closer to the ground when deployed. A support arm 302 having an adjustable length is also advantageous because it allows the gooseneck to be used with various different tractor models or other objects that it engages.

In some embodiments, the at least one support arm 302 can also be adjustable between a continuous set of infinite positions. To change positions in these embodiments, the telescoping portion 306 can slide into the sleeve portion 304. To control how far the telescoping portion 306 slides into the sleeve portion 304, the sleeve portion 304 can comprise a lever or latch that, when activated by a user, acts to prevent the telescoping portion 306 from sliding any further, locking the sleeve portion 304 and telescoping portion 306 into place at a desired length. Other means known in the art can also be used to prevent the telescoping portion 306 from sliding further. This provides the advantage of allowing the user to adjust the length of the at least one support arm 302 to any desired length, providing convenient compatibility with various tractor models and also allowing the support arm 302 to be more easily adjusted to provide a snug abutment against the tractor 106 (i.e., fine tuning the length of the support arm 302 once the tractor has been moved into place).

The crossbar 308 can be horizontally connected to the at least one support arm 302 and can comprise brackets 310 disposed at each of its ends such that it can engage with the edges of the tractor ramp 114, as best shown in FIG. 1E. The brackets 310 may prevent the gooseneck 102 from sliding back and forth horizontally when the tractor turns and/or changes speeds, as the brackets 310 can comprise elongated edges to prevent horizontal movement.

Figure 4A:
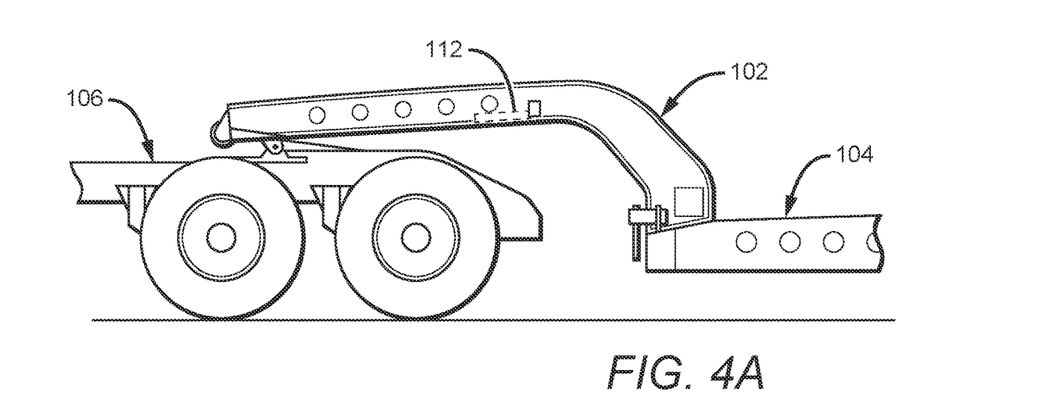
FIG. 4a is a schematic view of a right side of a trailer system according to the present disclosure with the support structure retracted.
Figure 4B:
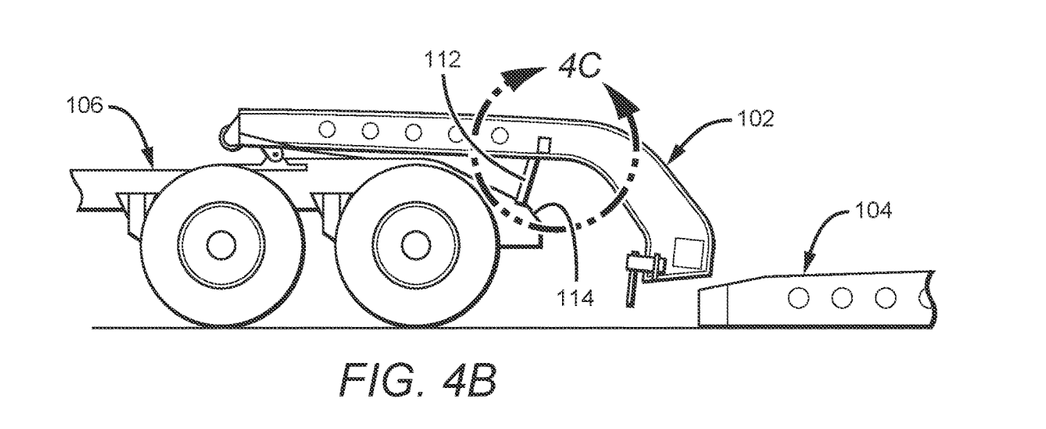
FIG. 4b is a schematic view of a right side of a trailer system according to the present disclosure with the support structure deployed.
Figures 4C, 5C:
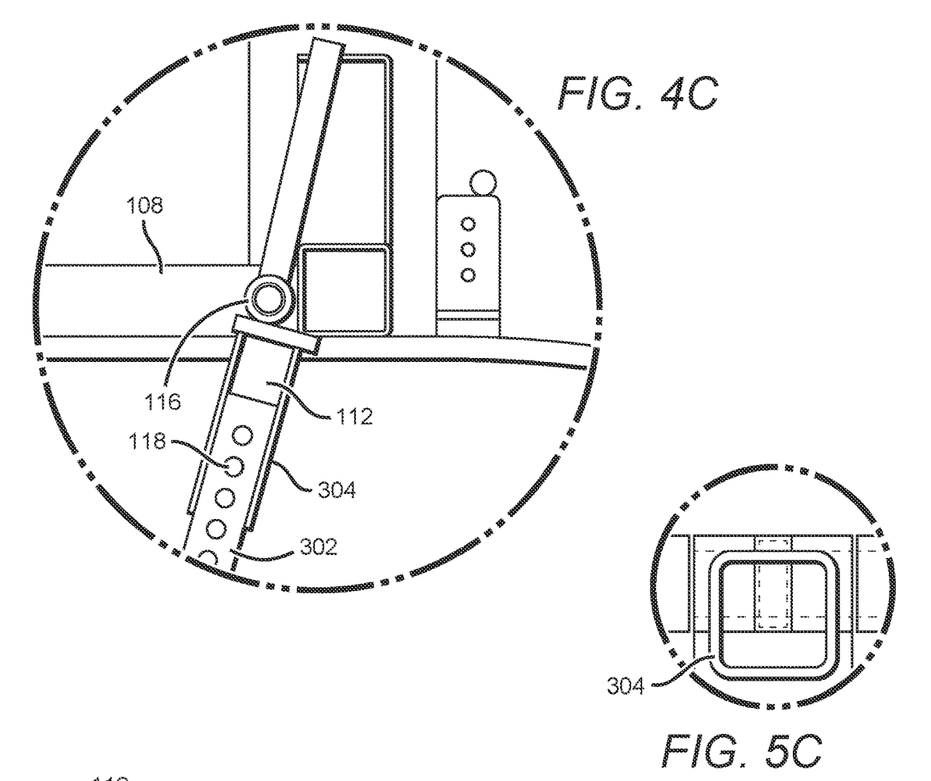
FIG. 4c is a close-up view of a portion of the trailer system shown in FIG. 4b.
FIG. 5c is a close-up view of a portion of the trailer system shown in FIG. 5b
Figure 5A:
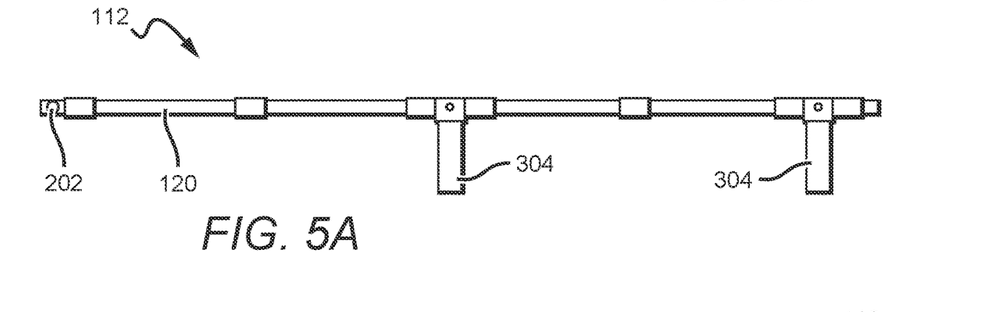
FIG. 5a is a front plan view of a portion of a support structure for use in trailer systems according to the present disclosure.
Figure 5B:
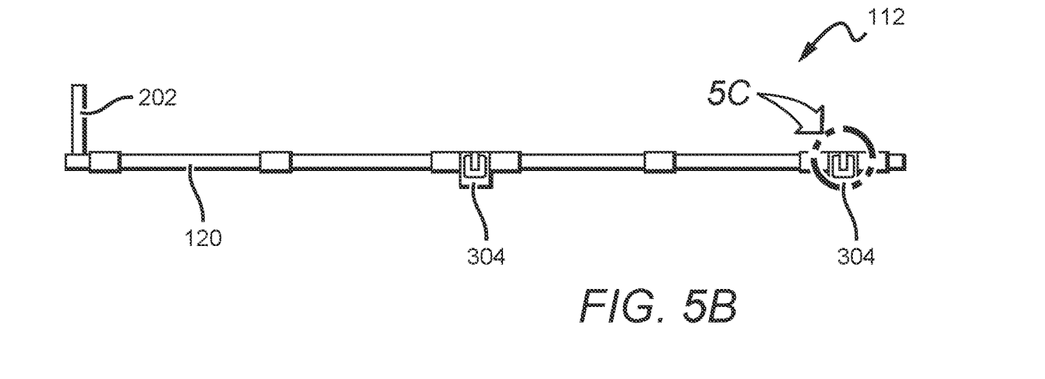
FIG. 5b is a top plan view of a portion of a support structure for use in trailer systems according to the present disclosure.
Figure 6A:
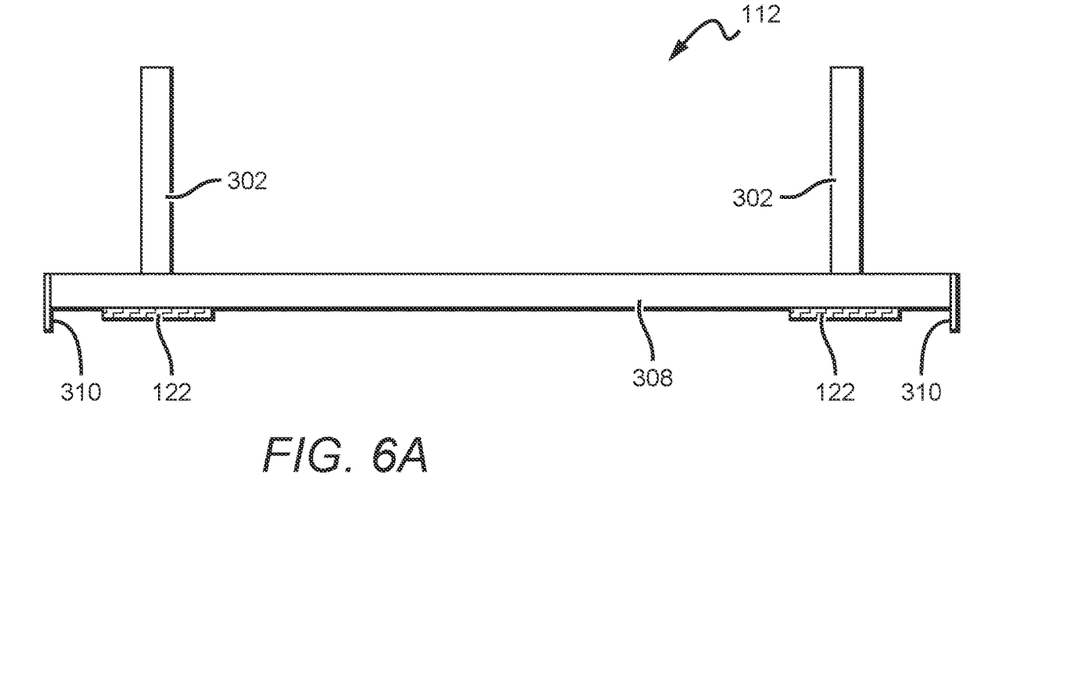
FIG. 6a is a front plan view of a portion of a support structure for use in trailer systems according to the present disclosure.
Figure 6B:
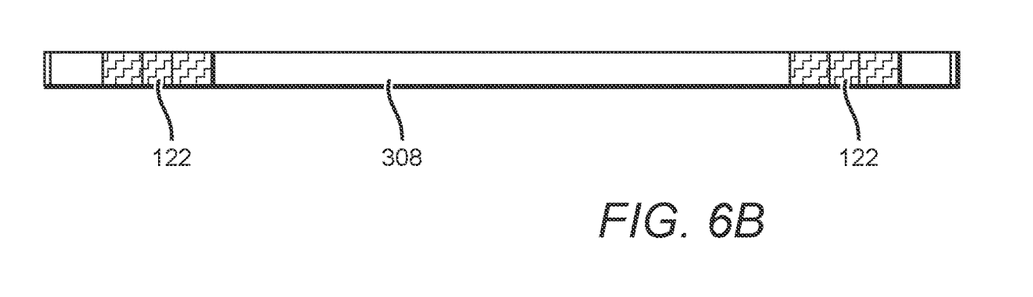
FIG. 6b is a top plan view of a portion of a support structure for use in trailer systems according to the present disclosure.
Figure 6C:
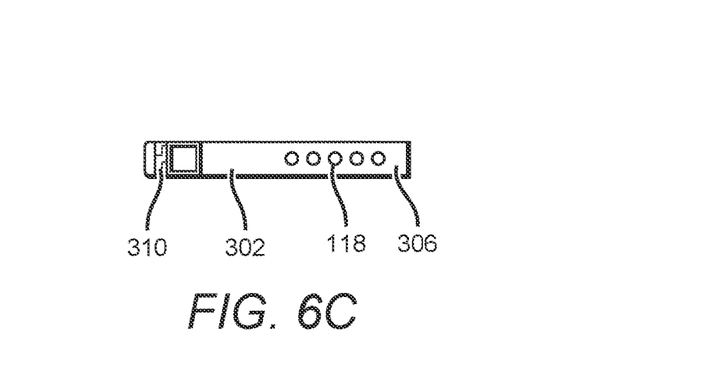
FIG. 6c is a right side plan view of a portion of a support structure for use in trailer systems according to the present disclosure, with the left side being a mirror image.

FIGS. 4-6 show further structural details of some embodiments of the gooseneck and support structure. Although the dimensions of one exemplary embodiment are shown, the given dimensions should in no way limit the scope of the support structure. Support structures having a range of sizes and dimensions for use with various gooseneck/trailer systems are contemplated herein and will be appreciated by those skilled in the art.

FIG. 4a shows the gooseneck 102 connected between the trailer 104 and the tractor 106. In this configuration the support structure 112 is stowed in the retracted position. FIG. 4b shows the gooseneck 102 attached to the tractor 106 but detached from the trailer 104. In this configuration the support structure 112 is in the deployed position and abuts the tractor ramp 114 as shown, providing support to the gooseneck 102 and preventing it from bouncing or shifting as much while the tractor 106 is being driven.

FIG. 4c shows a close-up view of the support structure 112 in the deployed position as shown in FIG. 4b. The support structure is pivotably connected to the gooseneck frame 108 at a pivot point 116. In this embodiment, the length of the support arm 302 may be adjusted to a number of discrete positions indicated by the plurality of holes 118 along the side of the support arm 302. A screw, pin, or the like may be used to lock the support arm 302 into the sleeve 304 at the desired length.

FIG. 5a shows a front plan view of a portion of the support structure 112. In this view, the support arm 302 has been removed from the sleeves 304. In this particular embodiment, the support structure 112 is moved between the retracted position and the deployed position mechanically using the lever 202 (as best shown in FIG. 5b).

FIG. 5b is a top plan view of the support structure 112. Here, the lever 202 is connected to an extended portion 120 of the support structure 112. In this embodiment, the support structure is simply rotated between the retracted and deployed positions using the lever 202. The extended portion 120 allows the lever 202 to be positioned on the outside of the gooseneck frame 108 so that it is safely and conveniently accessible without requiring a user to go underneath the gooseneck 102 to retract/deploy the support structure 112.

FIG. 6a is a front plan view of another portion of the support structure 112, namely the support arm 302 portion. This particular embodiment comprises two support arms 302 which extend out to the crossbar 308. Brackets 310 are disposed on both ends of the crossbar to engage the edges of the tractor ramp 114 and prevent the gooseneck 102 from sliding back and forth horizontally when the support structure 112 is deployed. Pads or grips 122 may be included to provide better contact between the support structure 112 and the tractor 106.

FIG. 6b is a top plan view of the portion of the support structure 112 shown in FIG. 6a.

FIG. 6c is a right side view of the portion of the support structure 112 shown in FIGS. 6a and 6b. The telescoping portions 306 of the support arms 302 include the holes 118 for adjusting the support structure 112 length.

It is understood that embodiments presented herein are meant to be exemplary. Embodiments of the present disclosure can comprise any combination or compatible features shown in the various figures, and these embodiments should not be limited to those expressly illustrated and discussed.

Although the present disclosure has been described in detail with reference to certain configurations thereof, other versions are possible. Therefore, the spirit and scope of the disclosure should not be limited to the versions described above. The foregoing is intended to cover all modifications and alternative constructions falling within the spirit and scope of the disclosure as expressed in the appended claims, wherein no portion of the disclosure is intended, expressly or implicitly, to be dedicated to the public domain if not set forth in the claims.

I claim:

1. A trailer support structure, comprising:
   at least one support arm configured to be pivotably connected to a frame at a pivot point; and
   a crossbar connected to an end of said at least one support arm opposite said pivot point, said crossbar extending in a direction that is orthogonal to said at least one support arm, said crossbar comprising brackets disposed at opposing ends of said crossbar, said brackets extending away from said crossbar in a direction that is parallel to said at least one support arm;
   wherein said at least one support arm is configured to pivot between a retracted position that is substantially parallel to a top portion of said frame and at least one deployed position angled at less than 90 degrees relative to said frame.

2. The support structure of claim 1, wherein said at least one support arm comprising a sleeve portion and a telescoping portion, said telescoping portion configured to slide within said sleeve portion such that the length of said at least one support arm is adjustable.

3. The support structure of claim 2, wherein said length of said at least one support arm is adjustable between a discrete set of at least two positions.

* * * * *